United States Patent
Glidden

(10) Patent No.: US 9,633,057 B2
(45) Date of Patent: Apr. 25, 2017

(54) METHOD AND SYSTEM FOR COLLECTING, SEARCHING AND DETERMINING THE STRENGTH OF CONTACTS FROM A MOBILE CONTACT LIST

(71) Applicant: Introhive Inc., Fredericton (CA)

(72) Inventor: Jody Glidden, Miami Beach, FL (US)

(73) Assignee: IntroHive Inc., Fredericton (CA)

( * ) Notice: Subject to any disclaimer, the term of this patent is extended or adjusted under 35 U.S.C. 154(b) by 107 days.

(21) Appl. No.: 14/373,320

(22) PCT Filed: Feb. 1, 2013

(86) PCT No.: PCT/CA2013/000098
§ 371 (c)(1),
(2) Date: Jul. 18, 2014

(87) PCT Pub. No.: WO2013/120171
PCT Pub. Date: Aug. 22, 2013

(65) Prior Publication Data
US 2014/0358946 A1 Dec. 4, 2014

Related U.S. Application Data

(60) Provisional application No. 61/594,618, filed on Feb. 3, 2012, provisional application No. 61/594,708, filed
(Continued)

(51) Int. Cl.
*G06F 17/30* (2006.01)
*G06Q 10/10* (2012.01)
(Continued)

(52) U.S. Cl.
CPC .. *G06F 17/30303* (2013.01); *G06F 17/30286* (2013.01); *G06Q 10/10* (2013.01);
(Continued)

(58) Field of Classification Search
CPC ............... G06F 17/30; G06F 17/30663; G06F 17/3053; G06F 17/30722; G06F 17/30707; G06F 17/3011; G06F 17/30303
(Continued)

(56) References Cited

U.S. PATENT DOCUMENTS 6,973,299 B2  12/2005  Apfel
7,849,103 B2  12/2010  Hyatt et al.
(Continued)

OTHER PUBLICATIONS

International Search Report for PCT/CA2013/000098 (Publication No. WO 20131120171) dated May 9, 2013.

*Primary Examiner* — Isaac M Woo
(74) *Attorney, Agent, or Firm* — Bruce M. Green; Oyen Wiggs Green & Mutala, LLP

(57) ABSTRACT

The method allows users of mobile devices or desktop/laptops in an organization to perform a search on a collated list of contacts for a particular contact and determine who, within the system/organization, may have that contact in their list. Contact lists from individual mobile devices are collated and stored and are searchable. A rating for the strength of each contact in a user's mobile contact list is made by determining the type of contact that the user uses to communicate with the contact and by the frequency with which the user communicates with the contact. This can be done across the contacts for the entire organization. The organization can also determine the strength of the contact list of someone in the organization or the relative strength of each contact.

10 Claims, 9 Drawing Sheets

| Position/Title | Value |
|---|---|
| President | 20 |
| Vice President | 19 |
| Director | 17 |
| Sr. Manager | 15 |
| Manager | 14 |
| Supervisor | 12 |
| . | . |
| . | . |
| . | . |
| . | . |

| Organization Size | Value |
|---|---|
| 1500 + | 10 |
| 1000 - 1500 | 9 |
| 750 - 1000 | 8 |
| 500 - 750 | 7 |
| 350 - 500 | 6 |
| . | . |
| . | . |
| . | . |

Related U.S. Application Data on Feb. 3, 2012, provisional application No. 61/594,728, filed on Feb. 3, 2012, provisional application No. 61/597,946, filed on Feb. 13, 2012, provisional application No. 61/604,126, filed on Feb. 28, 2012, provisional application No. 61/712,405, filed on Oct. 11, 2012.

(51) Int. Cl.
| | |
|---|---|
| *H04W 8/18* | (2009.01) |
| *H04W 4/02* | (2009.01) |
| *H04W 4/20* | (2009.01) |
| *H04W 8/20* | (2009.01) |

(52) U.S. Cl.
CPC ............ *H04W 4/02* (2013.01); *H04W 4/206* (2013.01); *H04W 8/18* (2013.01); *H04W 8/205* (2013.01)

(58) Field of Classification Search
USPC .................................................. 707/600–899
See application file for complete search history.

(56) References Cited

U.S. PATENT DOCUMENTS

| | | |
|---|---|---|
| 2004/0176974 A1 | 9/2004 | Twig et al. |
| 2006/0084478 A1 | 4/2006 | Erlichmen |
| 2006/0135142 A1 | 6/2006 | Repka |
| 2008/0275865 A1* | 11/2008 | Kretz ................ G06F 17/30867 |

\* cited by examiner

| Position/Title | Value |
|---|---|
| President | 20 |
| Vice President | 19 |
| Director | 17 |
| Sr. Manager | 15 |
| Manager | 14 |
| Supervisor | 12 |
| . | . |
| . | . |
| . | . |
| . | . |

| Organization Size | Value |
|---|---|
| 1500 + | 10 |
| 1000 - 1500 | 9 |
| 750 - 1000 | 8 |
| 500 - 750 | 7 |
| 350 - 500 | 6 |
| . | . |
| . | . |
| . | . |

Figure 3

METHOD AND SYSTEM FOR COLLECTING, SEARCHING AND DETERMINING THE STRENGTH OF CONTACTS FROM A MOBILE CONTACT LIST

CROSS-REFERENCE TO RELATED APPLICATIONS

The present application claims the benefits, under 35 U.S.C. §119(e), of the following U.S. Provisional Applications: Ser. No. 61/594,618 filed Feb. 1, 2012 entitled "Method and System for Collecting and Searching of Mobile Contacts"; Ser. No. 61/594,708 entitled "Method and System for Determining the Strength of a Contact from a Mobile Contact List" filed Feb. 2, 2012; Ser. No. 61/594,728 entitled "Method and System for Determining the Strength of a Contact from a Mobile Contact List Based on Frequency" filed Feb. 2, 2012; Ser. No. 61/597,946 entitled "Method and System for Collection of Mobile Contacts Without a Contact List" filed Feb. 13, 2012; Ser. No. 61/604,126 entitled "Method for Determining the Strength of an Organization's Relationship with a Contact" filed Feb. 28, 2012; and Ser. No. 61/712,405 entitled "Method for Determining the Strength of Contacts for an Individual" filed Oct. 11, 2012, all of which are incorporated herein by reference.

TECHNICAL FIELD

This invention relates to the field of communication and business networking. More particularly, the invention relates to the field of gathering contacts from mobile devices to enable searching and determining the strength of the contacts, individually or across an organization.

BACKGROUND

Sales people and executives cultivate contacts throughout their careers. These contacts may provide an advantage over another individual based on how strongly connected the person may be. The value of the contact is also impacted by the position/title of the contact and the size of the organization by whom the contact is employed.

Most mobile devices (mobile phones, smartphones, tablets) today have a contact list that is either populated by the device owner or imported via another process. These contact lists are sometimes synchronized on the mobile device with another contact list to which the user has access. These contact lists may also be built from a common list of contacts and then added to by the user.

One of the problems is that it is difficult to measure how 'well connected' an individual is. This would be impacted by many factors for example, but not limited to, the number of contacts the individual has, the position/title of the contacts, the size of the organization that the contact currently belongs to and how strong the individual's relationship with the contact is. Another problem is that it is difficult to compare the strength of connections (or how 'well connected') one individual may have versus another individual.

One of the problems with the current systems is that they do not allow other users to determine who might have a specific contact. These contacts may be shared one-on-one but they are not available as a whole. Nor do current systems indicate how strong each contact is. There is no indication if the contact in the list has ever been contacted or how the contact has been communicated with. Often people will enter information for a contact that they never use. There is no indication if the contact in the list is still an active contact or if it is an old contact no longer used.

Another existing problem with the current systems is that they do not allow a common search functionality to be available. They may allow an individual to see who other individuals' contacts are, but they do not allow for searching on a contact to see whose list they may be in. Another problem with the current systems is that they do not indicate how often the user communicates with the contact in their mobile contact list. There is no indication if the contact is one that is frequently used or very rarely.

Another problem with the current systems is that there is not a method for determining a user's contacts without a contact list. If a user is in frequent contact with someone but has not added them to their contact list then there is no method to determine that the user has that person as a known contact.

Another existing problem with the current systems is that if the frequently contacted person is not in the contact list then the information for that person is harder to share.

Another problem with existing systems is that they do not indicate how strong a relationship each contact has when viewed across an entire organization.

The foregoing examples of the related art and limitations thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention solves the problems with the current systems because it allows a user to perform a search on a particular contact and determine who, within the system/organization, may have that contact in their list. In this case the preferred platforms are a mobile device and a desktop/laptop platform. This invention does not require any end user intervention with regards to the collection of the contact list. This collection occurs in the background and is updated on a regular basis.

Each user has their contact list information collected and stored allowing another user to perform a search on this information. This collection only happens with the approval of the user and/or organization. The information collection includes, but is not limited to, the contact's First Name, Last Name, Title, Company Name, Email Address(es) and Phone Number(s) and the individual within the organization (or the mobile device) whose contact list contained the contact. This invention allows a user of the system to perform a search based upon the contacts information that has been collected and the search returns to them a list of users who have this contact in their contact list.

This invention solves additional problems with the current systems because it determines a rating for the strength of each contact in the user's mobile contact list. This strength is determined by the type of contact that the user uses to communicate with the contact. This strength is also determined by the frequency with which the user communicates with the contact. This invention does not require any end user intervention with regards to the determination of the strength of the contact. This determination occurs in the background and is updated on a regular basis.

The strength rating of the contact may be determined by identifying the different types of communication and how often each type of communication is used, and awarding a higher relative strength to a specific type of communication. An example of this is awarding a higher strength rating for voice communication versus an email communication. A higher relative strength may also be awarded to a contact with which the user is in frequent communication. This invention may add the ratings of each contact to the other information concerning the contacts that is retrieved.

According to another aspect of the invention, it solves a problem with the current systems where an individual's mobile device does not have a contact list. The system determines the individuals that a user has as contacts by monitoring the user's activity and noting frequently contacted individuals. This invention does not require any end user with regards to the creation and collection of this virtual list of contacts. This collection occurs in the background and is updated on a regular basis. Each user may have their frequently contacted individuals information collected and stored. This collection may only happen with the approval of the user and/or organization. The information collection may include, but not be limited to, the contacts First Name, Last Name, Title, Company Name, Email Address(es) or Phone Number(s) and the individual within the organization (or the mobile device) whose contact list contained the contact.

The foregoing examples of the alternate methods are intended to be illustrative and not exclusive. Other methods will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 3 is an example of two sample sales people and their contacts.

DESCRIPTION

Throughout the following description specific details are set forth in order to provide a more thorough understanding to persons skilled in the art. However, well known elements may not have been shown or described in detail to avoid unnecessarily obscuring the disclosure.

Accordingly, the description and drawings are to be regarded in an illustrative, rather than a restrictive, sense.

This invention allows contact information to be collected from mobile devices and stored on a server. This stored information can then be searched by another user of the system such as within an organization. The contact information and the strength rating of each contact may be collected from the mobile device without requiring interaction from the user. This information is collected at an interval that will ensure the data is current.

The contact information from all of the users of the system/organization is collated on a server. This server can process search requests from users of the system/organization and return to them the contact information as well as the user form which the contact information was retrieved.

Figure 1:
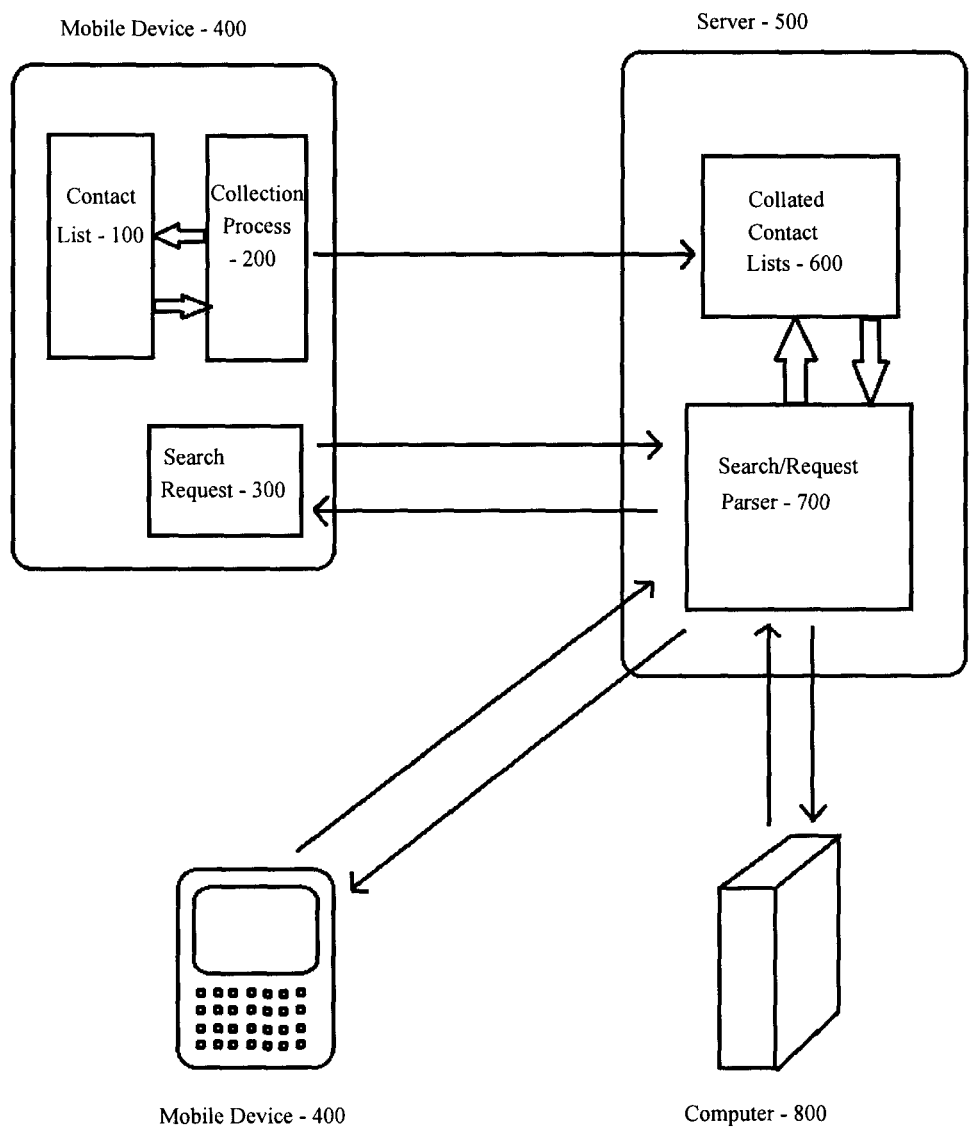
FIG. 1 is a schematic diagram illustrating the method and system of the invention.

The term "mobile device" is used herein to refer to mobile wireless communication devices which communicate over a communication network, including cellular telephones, mobile phones, smartphones, tablets, wireless laptop computers, smart phones, personal digital assistants (PDAs), pagers and the like. "Contact list" means the contact list of email addresses or phone numbers or both, stored on the mobile device. The invention is first described below with reference to FIG. 1.

Contact List—100

This is the contact list stored in data storage on the mobile device. This list contains information about the contact that may include some or all of the following: First Name, Last Name, Title, Company, Email Address(es) or Phone Numbers(s) and the individual within the organization (or the mobile device) whose contact list contained the contact.

Collection Process—200

This process collects the data from the contact list, calculates a strength of contact rating for each contact and sends the data to a server (or the server may obtain this by interrogating the mobile device). The strength of the contact rating may be determined by identifying the types of communication that have taken place and based on this assigning a rating. An example of this is (but not limited to) assigning a higher strength of contact rating to a contact with whom the user has had voice communication versus a contact with which the user has only sent an email.

The strength of the contact rating can also be determined by identifying the types of communication that have taken place and how often each type of communication is used. Based on this information, a strength of contact rating is calculated and assigned. An example of this is (but not limited to) assigning a higher strength of contact rating to a contact with whom the user has had frequent voice communication versus a contact with which the user has only communicated rarely.

This system may also collect the contacts' information for contacts with whom the user has frequently communicated, and send the data to a server. This information will be gathered each time a contact is made to determine the frequency over time.

Search Request—300

A search request may be issued from any device connected to the server. These devices may be the mobile device which has had its contact information collected and sent to the server, may be another mobile device or may be a computer.

Mobile Device—400

The mobile device is the device that contains the contact list. It may also be used to send a request for a search of the collated contact list information. The mobile device must be able to communicate with the server in some manner, preferably over the Internet or by other telecommunications network.

Server—500

The server 500 is the central point of storage for the information and must be able to receive the contact list information from the mobile devices as well as receive and process search requests.

The contact information from all of the users of the system/organization is collated on the server. This server will fill in missing information on contacts based on data stored in the collated list. The server will match pieces of information from user's contacts that were gathered based on frequency, and not a contact list, with other users who have the same contact to determine more information. One example of this would be a frequently called telephone number from User 1 that is not in their contact list and which is matched on the server with the contact list information from User 2 that has the phone number amongst their contact information (even if User 2 has never contacted that person). The server may also match pieces of information from user's contacts that were gathered based on frequency and not a contact list with publicly available information (one example being a phone directory) to fill in some of the contact's missing information.

The server 500 will also match information from incomplete contacts with the information stored in the server to try and determine a match so as to complete the contact information. The server may compare publicly available information with partial contact data to attempt to match the partial contact information.

Collated Contact Lists—600

This is the collated contact information (including strength of contact ratings) from all of the mobile devices in the system/organization. This information is received from the individual mobile devices and is compared to existing data to determine if an update to the collated information is needed.

Search/Request Parser—700

This component receives the search requests from devices (mobile and otherwise) that are communicating with the server. This component retrieves the resulting information from the collated contact list based on the search criteria it received.

This component packages the contact information it retrieved from the collated contact list in a manner that will indicate the strength of the contacts based on the ratings collected and return this information to the requestor.

Computer—800

This component is a computer that is communicating with the server as originator of search requests and a recipient of the search results.

This invention allows information of frequently contacted contacts to be collected from mobile devices and stored on a server even where there is no contact list on the mobile device. This stored information can then be searched by another user of the system/organization. With this invention, the contact information that can be collected from a mobile device will include frequently communicated with contacts and not just contacts stored in a contact list. This information is collected at an interval that will ensure the data is current.

Figure 2:
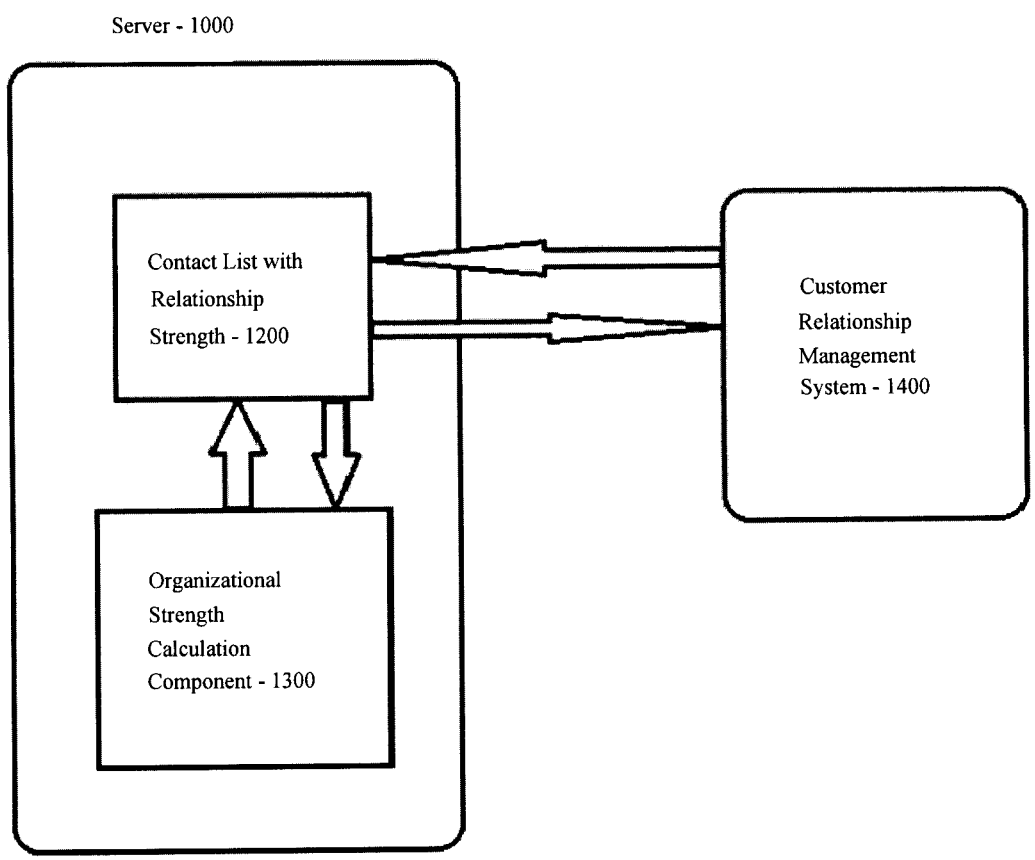
FIG. 2 is a schematic diagram illustrating the method and system of the invention.

With reference next to FIG. 2, according to another aspect the invention solves a problem with the current systems because it determines a rating for the strength of each contact for the organization by calculating the strength of the contact based on the strength rating of each individual's relationship with that contact. This invention would allow, for example, a user logged into an organization's Customer Relationship Management (CRM) to see a list of accounts and in each account view the contact list showing the strength of the relationship the contact had with the organization.

One method of determining the organization's strength of relationship is to add all of the relationship strengths of the connected users and dividing by the company's strongest relationship. An example of this would be: If there were 10 users who are each connected with a relationship strength of 90/100 to John Doe from Company A, then 900 would be the strongest relationship and the company's relationship with John Doe would be rated at 900/900 or 100%. If there were then 5 users who are each connected with and had an average relationship strength of 60 to Bobby Frank from Company B, then 300/900 or 33% would be the strength of the company's relationship with Bobby Frank.

Thus the invention may also utilize contact information collected from members of the organization and the strength of their relationships to determine an organizational relationship strength. With this invention, the strength rating of each individual with a contact is used to determine the top relationship strength with the organization and all other contact strengths are determined in comparison to the top relationship.

Server—1000

The server shown in FIG. 2 is the central point of storage for the contact strength each individual user has with a contact. The server will also contain the component that calculates the organizational strength of each contact.

Contact List with Relationship Strength—1200

This is the collated contact information (including the strength of contact ratings) from all of the mobile devices in the system/organization.

Organizational Strength Calculation Module—1300

This component retrieves the strength of contact ratings for each individual user with a contact and uses this information to determine the strongest relationship any contact has with the organization. This component then calculates the strength of all other contacts with the organization in relation to the strength of the strongest relationship.

This component will then communicate this organizational strength rating back to the Contact List with Relationship Strength—1200 for storage.

Customer Relationship Management System—1400

The user of the CRM can view a contact list within the organization which displays the strength of the relationship of the contact with the organization.

Figure 4:
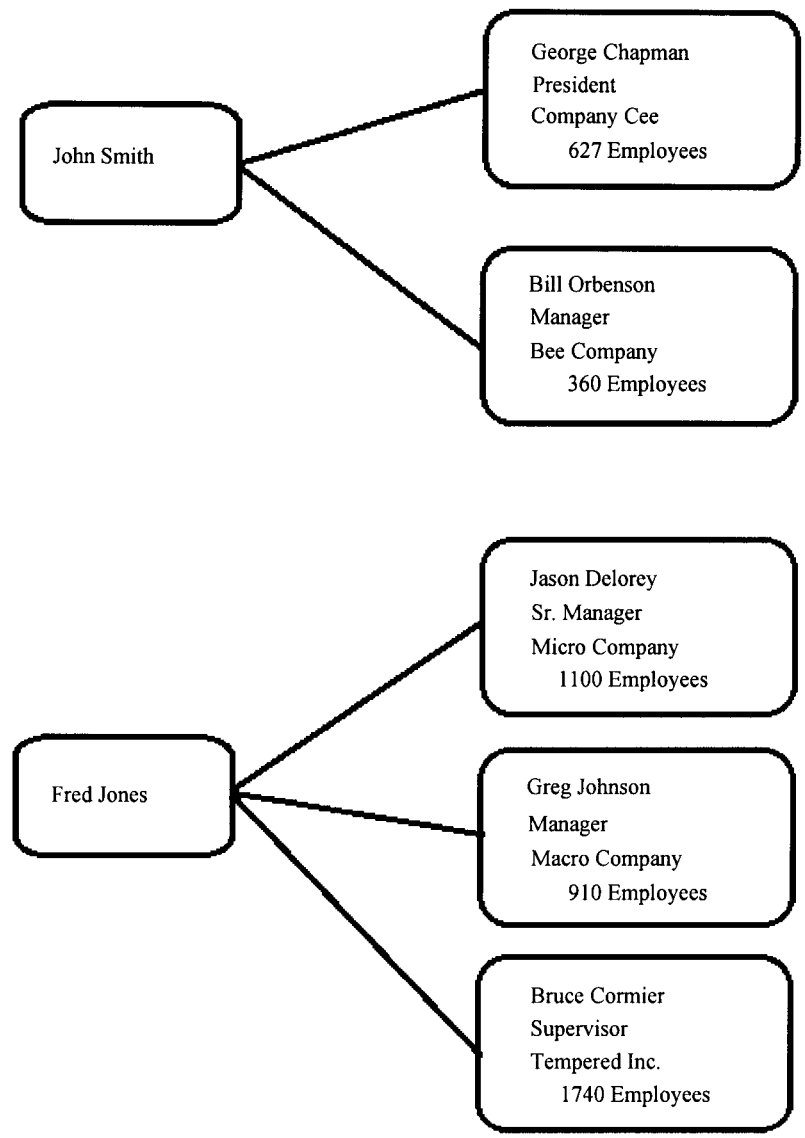
FIG. 4 is an example of rating that may be given to various positions/title and company sizes.
Figure 5:
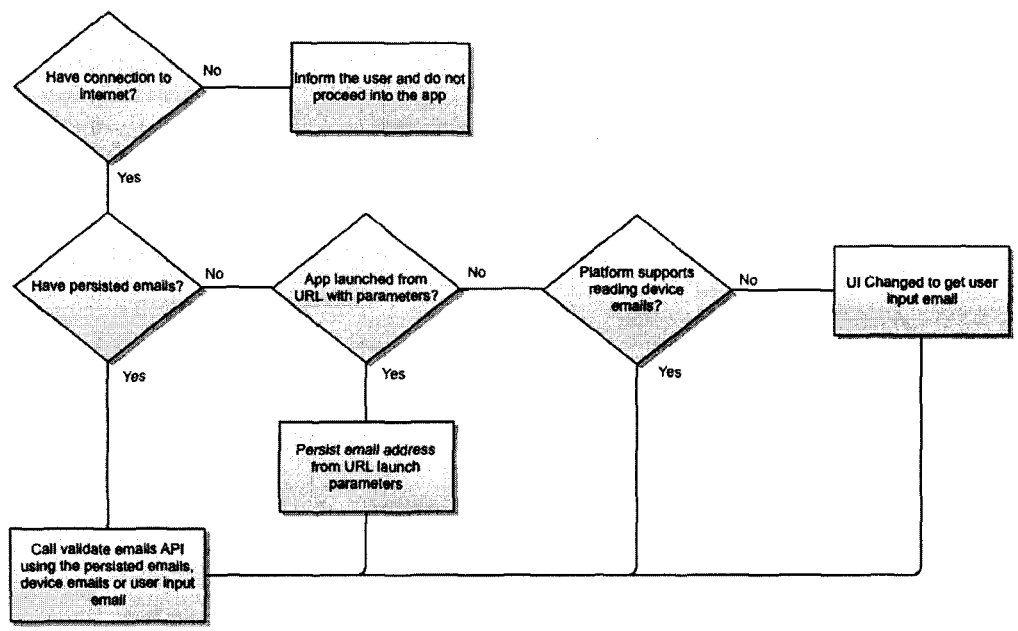
FIG. 5-9 are flowcharts illustrating the implementation of the invention as an application on a mobile device.

With reference to FIGS. 3 and 4, the invention solves another problem with the current system because it determines a rating for an individual based on the number of contacts, the strength of the relationship with each contact, the contacts position/title and the size of the organizations that the contacts are employed with. One method of determining how 'well connected' an individual is would be to assign a value or rating for every position/title and another value or rating for various company sizes. The resultant rating by combining these two values with the strength of the relationship can provide a quantitative measurement for each contact. A sum of these relationships could then provide an overall value for an individual's network of contacts.

An example of this would be: If a sales person was connected with a relationship strength of 90/100 to President John Doe from Company A that has 355 employees and a relationship strength of 75/100 to Supervisor Bobby Frank from Company B that has 550 employees then, depending on values given (see FIGS. 3 and 4), the overall rating for the individual would be 171. FIG. 3 contains two sample tables that would be populated with values determined by the weight that an organization puts on a contact's position/title and company size. These values would be used in a calculation that includes a rating that indicates the strength of the relationship that the individual has with the contact. This calculation would determine the strengths of the contacts.

FIG. 4 contains two examples to further explain this invention. The first example in FIG. 4 is John Smith. John has two contacts and the calculation could be determined as such:

Contact #1 Position (20)×Company Size (7)×
Strength of relationship (70/100)=98

Contact #2 Position (14)×Company Size (6)×
Strength of relationship (90/100)=76

For a total strength of contacts of 174.

The second example in FIG. 4 is Fred Jones. Fred has three contacts and the calculation could be determined as such:

Contact #1 Position (15)×Company Size (9)×
Strength of relationship (75/100)=101

Contact #2 Position (14)×Company Size (8)×
Strength of relationship (95/100)=106

Contact #3 Position (12)×Company Size (10)×
Strength of relationship (65/100)=78

For a total strength of contacts of 285.

Figure 6:
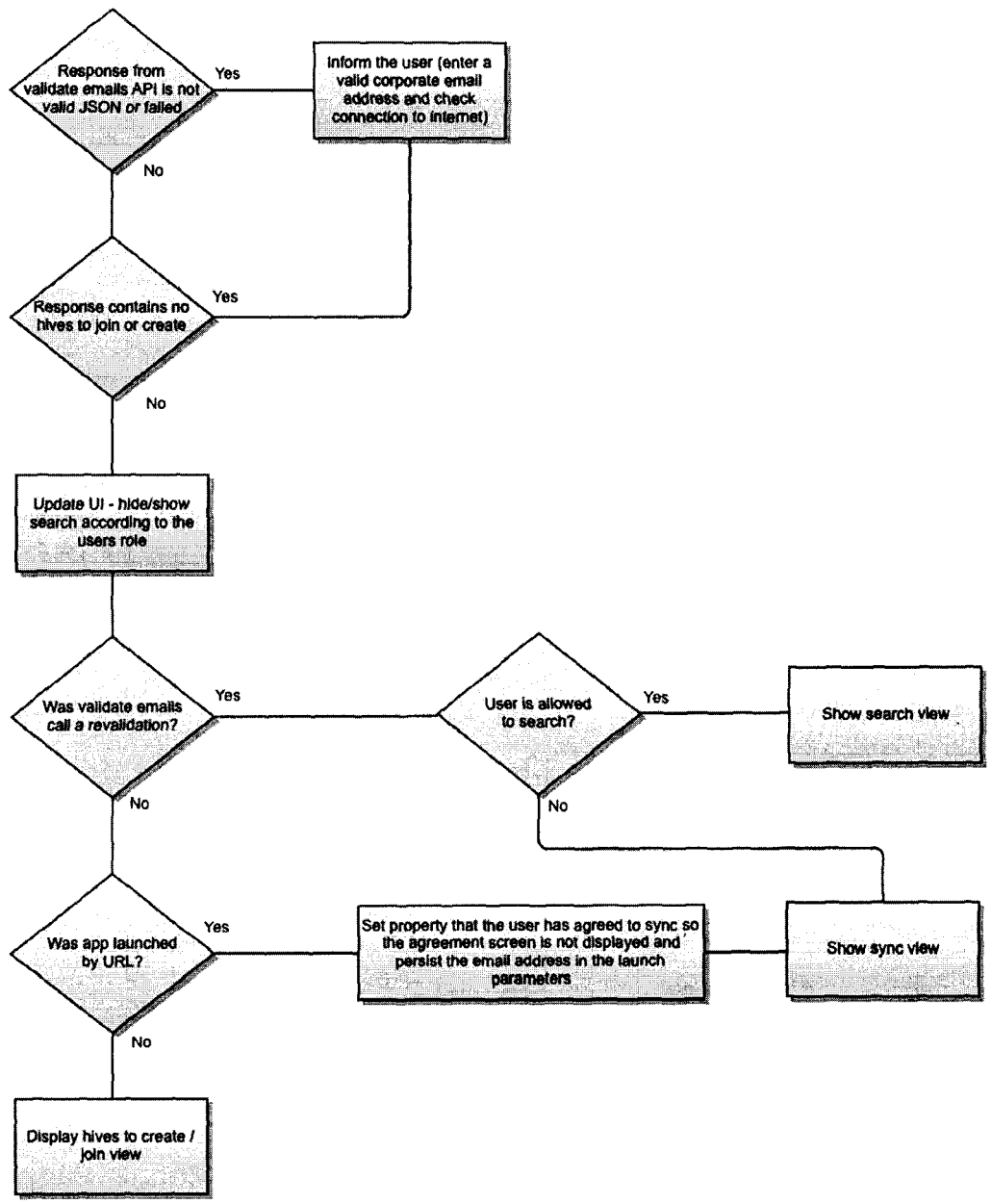
Figure 7:
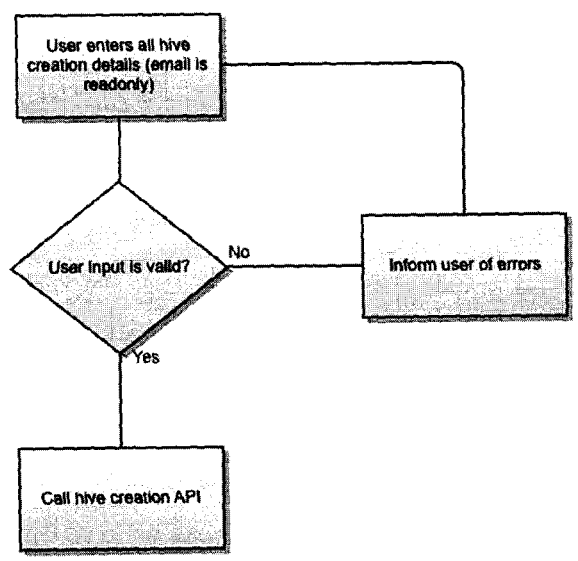

FIGS. 5 through 9 illustrate an example of the implementation of the invention as an application on a mobile device. Looking first at FIG. 5, the mobile device first connects to the system over the Internet to do the initial application configuration setup. The user enters his/her corporate email address or the system may recognize the device's email. The email address is then validated as shown in FIG. 6. If the email is valid the system determines if it relates to an existing collated list of contacts 600 (referred to in FIG. 6 as a "hive"). If it does the user is either displayed a search page or a page showing the mobile device is synchronizing with the server. If it does not the user is invited to create a new collated list of contacts 600 following the process in FIG. 7.

Figure 8:
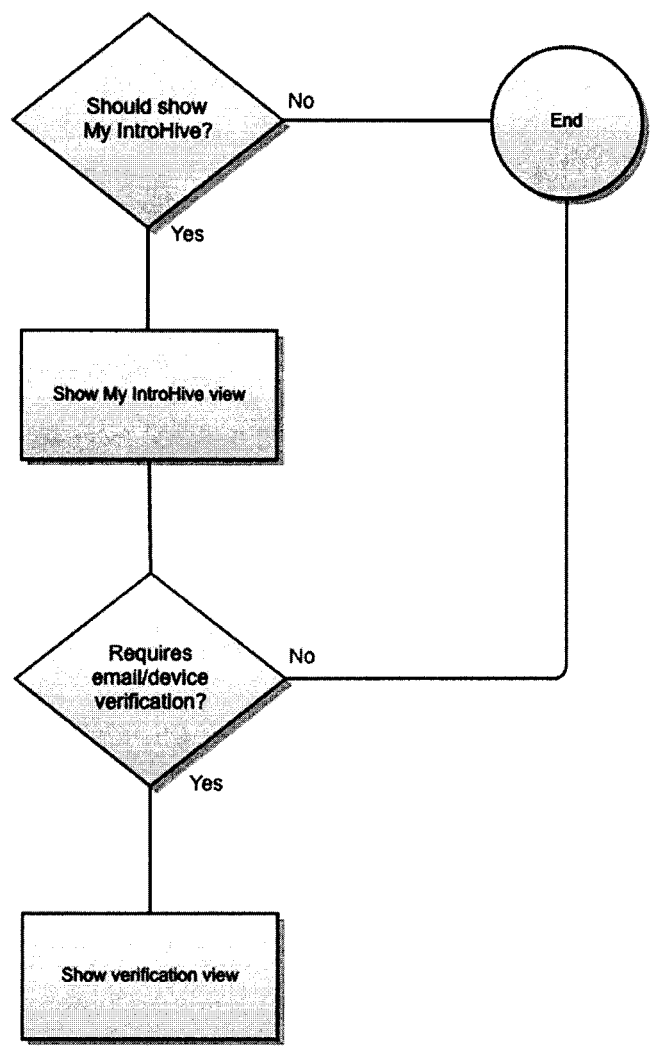

When the search and/or synchronization page is displayed to the user a further verification of the device is performed as shown in FIG. 8. If the device has not been synced to the server before, a further verification of the device or email may be required to ensure authorization for the search or sync.

Figure 9:
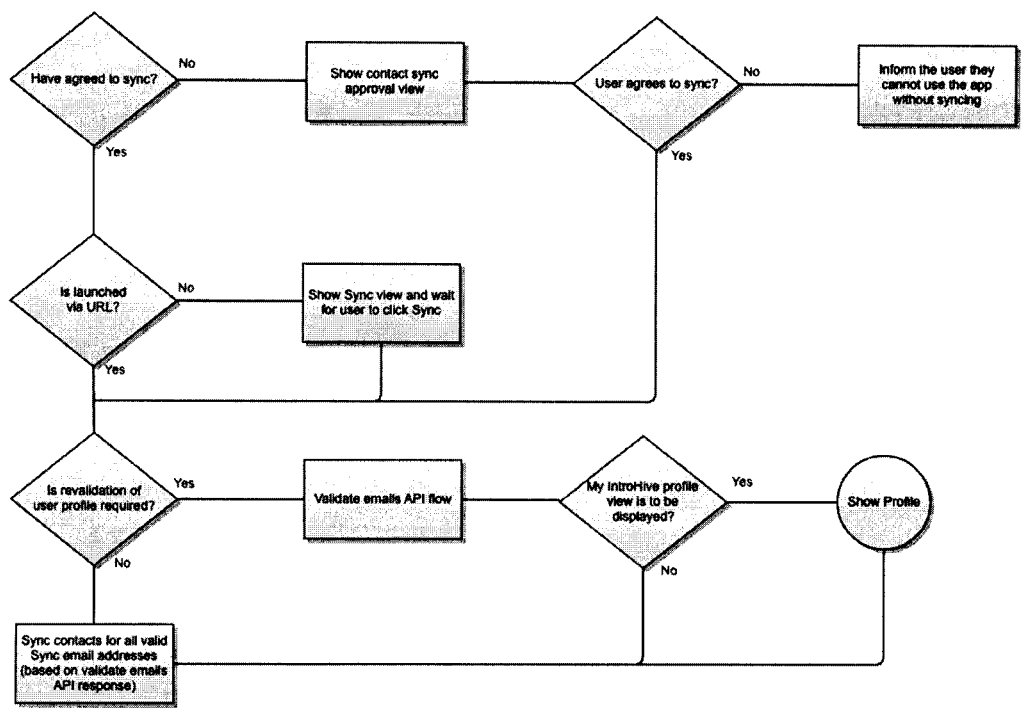

FIG. 9 illustrates the process for synchronizing the contact list from the mobile device with the collated list 600 on the server. The system prompts the user to agree to the sync, verifies that the contacts on the device are valid email addresses and adds them to the list 600. The database containing collated list 600 is updated by the server retrieving the contact list from data storage in the mobile device 400 and storing the contact list in the contact list database. Each mobile device 400 has a routine to format the contacts into json to be passed over HTTPS to a REST API endpoint on the server where they are queued for processing. Periodically, the mobile device will also send to the server the communication statistics for individual contacts to be aggregated and calculated into the relationship strength.

Practical applications of this method include i) Sales organizations where different sales representatives can query the collated contact list to find who in the organization may have contact with someone they wish an introduction to and who has the strongest contact with that person, with frequency of contact playing a role in the determination of the strength of the contact rating; ii) Associations or other groups that agree to network via one another's contacts such as the alma-mater of colleges; iii) Research organizations and universities where researchers may wish to find someone at their organization or institute that has contact (and how strong that contact is) with someone in the field for which they are looking for specific knowledge; iv) Any organization that may be required to adhere to specific standards where someone may want to search for a specific individual with expertise in an area of knowledge that is causing them issue and be assisted in determining who has the strongest contact with that individual.

Further practical applications of this method include v) A situation where someone in the organization is in such frequent contact with an individual that they do not need to add their information to their contact list and would share their contact with someone within their organization; vi) Sales organizations where different sales representatives can utilize a CRM to view a contact list to find the strength of the relationship of a contact with the organization. The sales representatives could then improve that organizational contact strength by improving individual relationships with the contact or having more sales representatives initiate a relationship with the contact; vii) Research organizations and Universities where researchers may wish determine the strength of the relationship that their organization or institute has with a contact and improve that relationship; viii) Sales organizations would use this invention to determine the value to the sales team that an individual brings. A sales organization would use this method to pre-screening individual sales candidates; ix) An organization could use this invention to determine the comparative strengths of an individual's network of contacts for recognition or reward.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method of collecting and searching, over a computer network, contact information from one or more of a plurality of mobile devices associated with an organization in order to provide overall values for the networks of contacts of one or more of a plurality of individuals within said organization, comprising:

i) providing a contact information database and a server accessible to said computer network;

ii) said server receiving from said one or more of a plurality of mobile devices first contact information comprising a first contact's name, email address, telephone number, the identity of the individual whose mobile device contained said first contact information, information relevant to the rating of the strength of the first contact's relationship with said individual, and an identification of the entity with which said first contact is associated, if any, and said first contact's title or position within said entity with which said contact is associated, if any;

iii) said server adding said first contact information to said contact information database;

iv) said server calculating and storing a value representing the strength of said first contact's relationship with said individual;

v) said server calculating and storing a first contact value for the individual's relationship to said first contact determined by the first contact's position, said entity's size, and the strength of the contact's relationship with said individual controlling said mobile device;

vi) said server repeating steps ii) through iv) for all said individual's contacts; and vii) said server calculating and summing said contact values for all said individual's contacts in said database and storing said sum as the overall value for said individual's network of contacts and storing said overall value in said contact information database.

2. The method of claim 1 comprising the further steps:
viii) said server calculating an overall value for a network of contacts for each of a plurality of individuals within said organization and storing said overall values in said contact information database;
ix) said server receiving and parsing a search request from a computing device to generate a search command;
x) said server searching said contact information database using said search command to generate a search result;
xi) said server delivering said search result to said computing device.

3. The method of claim 1 wherein said information relevant to the rating of the strength of the contact's relationship with said individual is selected from the group consisting of i) the type of communication between the contact and said one or more of a plurality of mobile devices, ii) the frequency of communication between the contact and said one or more of a plurality of mobile devices.

4. The method of claim 1 wherein said contact information database is updated periodically by synchronizing with said one or more of a plurality of mobile devices over said computer network.

5. The method of claim 1 wherein said contact information database is updated by said server retrieving a contact list from data storage in said mobile device and storing said contact list in said contact information database.

6. The method of claim 1 wherein one or more of said plurality of mobile devices do not have contact lists, further comprising the steps of said server receiving from said one or more of a plurality of mobile devices which do not have contact lists a record of email or telephone communications made to and from each said mobile device and determining the frequency of contact with each email address or phone number; and said server creating contact information for the individual whose mobile device contained said record by selecting the most frequent contacts for said individual, obtaining from said contact information database said contact's name, title and identification of the entity with which said contact is associated, and adding said contact information to said database in association with said individual.

7. A non-transitory computer readable storage medium having program code stored thereon, wherein the program code, when executed by a server accessible to a computer network and comprising a contact information database, performs the following tasks:
i) receiving from said one or more of a plurality of mobile devices first contact information comprising a first contact's name, email address, telephone number, the identity of the individual whose mobile device contained said first contact information, information relevant to the rating of the strength of the first contact's relationship with said individual, and an identification of the entity with which said first contact is associated, if any, and said first contact's title or position within said entity with which said contact is associated, if any;
ii) adding said first contact information to said contact information database;
iii) calculating and storing a value representing the strength of said first contact's relationship with said individual;
iv) calculating and storing a first contact value for the individual's relationship to said first contact determined by the first contact's position, said entity's size, and the strength of the contact's relationship with said individual controlling said mobile device;
v) repeating steps ii) through iv) for all said individual's contacts; and
vi) calculating and summing said contact values for all said individual's contacts in said database and storing said sum in said contact information database as the overall value for said individual's network of contacts;
vii) calculating an overall value for a network of contacts for each of a plurality of individuals within said organization and storing said overall values in said contact information database;
viii) receiving and parsing a search request from a computing device to generate a search command;
ix) searching said contact information database using said search command to generate a search result; and
x) delivering said search result to said computing device.

8. The non-transitory computer readable storage medium of claim 7 wherein said program code further performs the task of periodically updating said contact information database by synchronizing with said one or more of a plurality of mobile devices over said computer network.

9. The non-transitory computer readable storage medium of claim 7 wherein said program code further performs the task of periodically updating said database by said server retrieving a contact list from data storage in said mobile device and storing said contact list to said contact information database.

10. The non-transitory computer readable storage medium of claim 7 wherein said information relevant to the rating of the strength of the contact's relationship with said individual is selected from the group consisting of i) the type of communication between the contact and said one or more of a plurality of mobile devices, ii) the frequency of communication between the contact and said one or more of a plurality of mobile devices.

* * * * *